United States Patent [19]

Katz

[11] 4,259,942
[45] Apr. 7, 1981

[54] SOLAR HEATERS

[76] Inventor: Ami Katz, 8 Maaley Habanim, Ramath Gan, Israel

[21] Appl. No.: 846,586

[22] Filed: Oct. 28, 1977

[30] Foreign Application Priority Data

May 27, 1977 [IL] Israel ............................ 52175

[51] Int. Cl.$^2$ ................................ F24J 3/02
[52] U.S. Cl. ........................... 126/442; 165/171
[58] Field of Search ............ 126/271, 272, 432, 438, 126/447, 448, 450, 428, 451; 165/171, 182; 285/DIG. 22; 403/384, 399; 240/68 R, 49

[56] References Cited

U.S. PATENT DOCUMENTS

| 2,687,626 | 8/1954 | Bartlowe | 165/171 X |
| 3,945,059 | 3/1976 | Allollo | 126/271 |
| 3,994,279 | 11/1976 | Barak | 126/271 |
| 4,007,729 | 2/1977 | Chao | 126/271 |
| 4,038,971 | 8/1977 | Bezborodko | 126/271 |

FOREIGN PATENT DOCUMENTS

| 2027451 | 12/1971 | Fed. Rep. of Germany | 165/171 |
| 2547856 | 5/1977 | Fed. Rep. of Germany | 126/271 |

Primary Examiner—Dave W. Arola
Attorney, Agent, or Firm—Browdy and Neimark

[57] ABSTRACT

The present invention relates to solar heat collectors as used in arrangements for heating water by means of sun irradiation. More particularly the invention relates to large area collectors which are used in raising the temperature of swimming pools and like bodies of water.

2 Claims, 4 Drawing Figures

SOLAR HEATERS

BACKGROUND OF INVENTION

The proposed collector comprises a number of panels constituting the base of the collector; pipes or hoses extending across the assembled base, all these elements being made of plastic, each panel having a number of longitudinal groove-like emplacements of substantially paraboloidal profile and nose-like projections at distances from one another within the said emplacements.

The pipe or hose conduits are held in the said emplacements, being clamped between one side of the groove-like emplacement and said projections, the said conduits being interconnected and provided with means for connection with a water supply and with means for connection with a body of water which has been heated while in said conduits.

The collector is connected in a conventional manner with a source of water to be heated and a pool.

Collectors with which this application deals are intended to supply warm water without heating it to such a degree as would be required in domestic establishments. In face, water to be used in swimming pools should have a temperature of about 35° C while in domestic establishments water is required having a temperature between 60° and 80° C.

OBJECTS OF THE INVENTION

It is the object of the present invention to provide collectors which can easily and inexpensively be manufacturered and which can be put in place in a simple and quick manner.

In order to obtain the object of the invention and in accordance therewith the base of the collector is constituted by plates or panels of plastics which are fitted with means for holding the pipes or tubes in which the water is to be heated, further there being arranged groove-like emplacements for the said tubes or pipes which position those in a manner that the sunrays impinging on the collector become trapped in the said emplacements and thus improve the beneficial effect of the sun irridation. This effect is attained by giving the said groove-like emplacements a paraboloidal cross section, so that sun rays impinging on the plates are reflected onto the pipes.

Preferably the plates forming the base of the collector are white or of a light color, while the tubes or hoses are black.

The invention further relates to a method of setting up the collectors according to the invention.

FIELD OF THE INVENTION

The known collectors as used e.g. in domestic establishments comprise a base or backplate on which are held the pipes in which water circulates and from which it is led to a storage tank, the whole being enclosed in a casing the top wall of which is transparent. Such collectors customarily have a size of approximately 1×2 meters and in cases where collectors of large areas are required a number of such units are placed side by side and are connected either in line or in series.

In contra-distinction to such an arrangement the base plate or back of the large area collector according to the present invention is first prepared by placing side by side sections of appropriately molded plates or panels (as will become clear from the following detailed description) to form a large area base plate onto which are then arranged throughgoing lenths of tube or plastic hose in which water flows and in which it is heated up to the required degree.

According to a further feature of the invention the said base plates are provided with longitudinally extending groove-like emplacements in which the plastic tubes or hoses are placed and in which they are held by nose-like projections molded integrally with the plastic plates.

SHORT DESCRIPTION OF DRAWINGS

The invention will now be described with reference to the annexed drawings. In the drawings FIG. 1 illustrates one of the panels from which the base for the new collector is formed.

FIG. 5 is a plan view, partially schematic, of the assembled collector of the present invention.

DESCRIPTION OF PREFERRED EMBODIMENT

Figure 1:
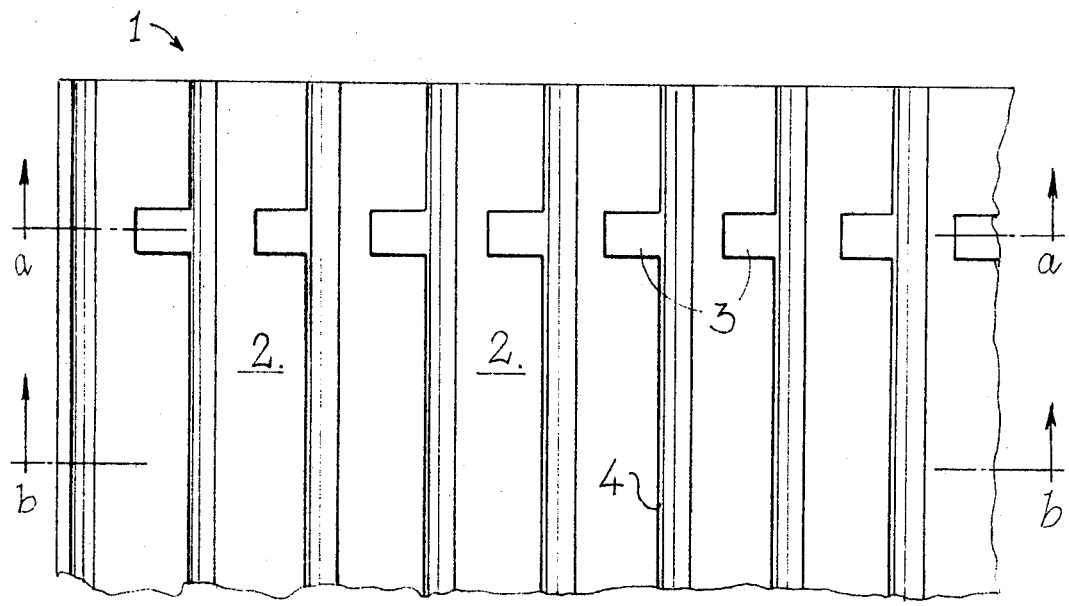

In practicing the invention the panel sections, one of which is shown in FIG. 1, are placed side by side on the ground, on a roof or whatever other location, with the edges of the panels in contact with one another and the grooves forming emplacements for the hose being in alignment. Once a sufficiently large area which has been chosen in accordance with calculations based on tests has been laid out, lengths of hose extending from one end of the so created base plate are inserted into the grooves and pressed into the lateral recesses formed on the noses 3. Now the ends of the hoses which may have a length of say 30 to 40 meters each are connected by manifolds or are connected in line continuously from one to another, as chosen for that specific purpose as shown in FIG. 5. Practically the collector is now ready for use and has to be connected at one or several points with the water supply grid and at one or several points with the pool to be treated as is also shown in FIG. 5.

Figure 2:
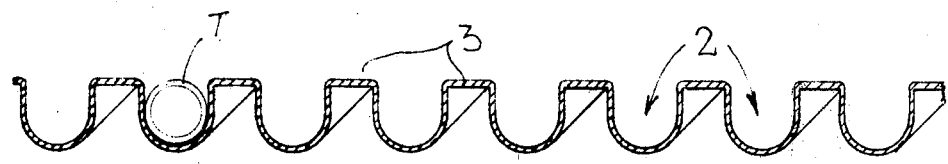
FIG. 2 is a partly perspective section on line a—a of FIG. 1.
Figure 3:
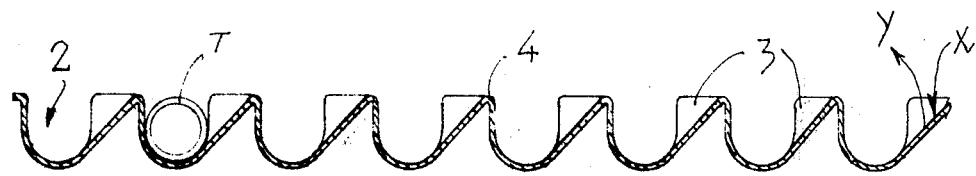
FIG. 3 is a section on line b—b of FIG. 1.
Figure 4:
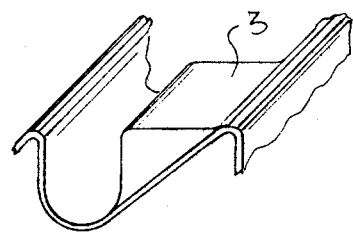
FIG. 4 is a perspective view of one of the noses intended to hold the plastic hoses on the base plate.

It will be seen that the panels can be molded integrally, having ridges between which the emplacements are formed and the noses within the grooves. The assembly is rather simple. The lengths of hose are simply placed in the grooves and forced into contact with the noses which now hold them in place. Turning now to the annexed drawings, a plastic panel indicated by the numeral 1 has a number of groove-like emplacements 2 of an assymetrical cross section, as can be gathered from FIG. 3. The said emplacements have a paraboloidal profile. They are defined by ridges 4 extending the length of each panel. At distances from one another are provided in the grooves 2 noses 3 which extend from one side of a groove 2 across its lengthwise extension. As can be seen in FIG. 4, the frontal face of each nose 3 is concave. Thus a plastic hose or tube T (see FIGS. 2 and 3) is firmly held between the wall of the respective groove and the said concavity of a nose 3.

While a number of panels 1 are combined to form the base of the collector, lengths of tube or hose extend over a number of such panels.

While in conventional collectors the base plate has always been painted a dark color so as to absorb a maximum of heat which is conducted to the pipe or coil on such a plate, the base plate of the present collector is preferably of a light color while the pipes are dark. As a result, sun rays meeting the panel e.g. at the point indicated by the arrow X in FIG. 3 will be reflected in direction of the arrow Y onto a pipe of the collector. As has been stated already, these latter are dark and will accumulate heat and thus heat up the water flowing in them.

In a conventional manner a motor driven pump is inserted in the conduit between the collector and the pool, so that the water is constantly circulated. Water cooled in the pool is redirected to the collector to be reheated and again directed to the pool.

I claim:
1. A solar heat collector, comprising:
   a plurality of plastic panels, constituting the base of the collector, said panels being disposed close to one another, each of said panels having a plurality of longitudinal groovelike emplacements of substantially paraboloidal profile and a plurality of noselike projections disposed within each of said emplacements at a distance from one another, each projection extending from a side of the corresponding emplacement;
   a plurality of interconnected plastic conduits held firmly within the emplacements of said panels, said conduits having a diameter slightly larger than the distance between said noselike projections and the side of said groovelike emplacements directly opposite the side from which the respective projections extend, said conduits thereby being firmly clamped within the emplacements of said panels;
   means connected to said conduits for connection with a water supply; and
   means connected to said conduits for communication with a body of water which has been heated while in said conduits.
2. A solar collector in accordance with claim 1, wherein said panels are light colored and said conduits are dark colored.

* * * * *